May 15, 1934.  A. KOVALOVSKY  1,958,919

FISHING REEL

Filed Nov. 13, 1931　　2 Sheets-Sheet 1

Inventor
Arthur Kovalovsky

By

Attorney

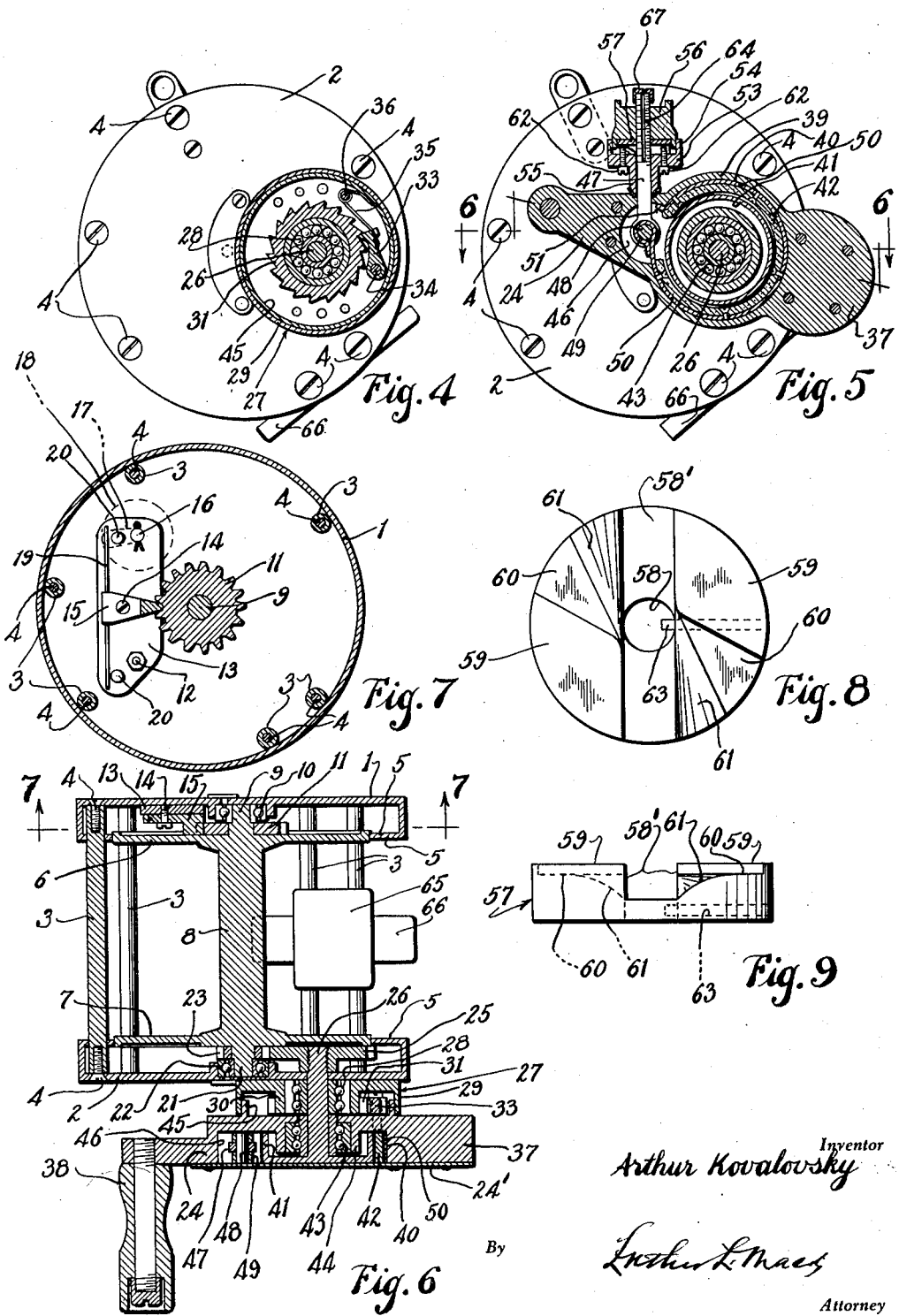

Patented May 15, 1934

1,958,919

UNITED STATES PATENT OFFICE 1,958,919

FISHING REEL

Arthur Kovalovsky, Los Angeles, Calif.

Application November 13, 1931, Serial No. 574,711

7 Claims. (Cl. 242—84.5)

This invention relates to and has for an object the provision of an improved type of fishing reel, and more particularly comprehends the provision of certain improvements relating to standard fishing reels whereby a clutch or drag is provided in connection with the reel proper for regulating the tension and playing out of the line to correspond to the size of the "catch" and other conditions attendant upon landing the "catch".

An object also is to provide in connection with an improved type of clutch or drag device applied to the handle by means of which the reel is rotated in a given direction, a sensitive adjusting device for regulating the drag on the line to meet conditions as they may occur in landing a fish.

Generally described my improvements consist in the provision on a standard reel of a handle operatively connected with the reel in such a manner that the handle when rotated will rotate the reel for winding the line thereon and will be yet prevented from rotation in a reverse direction. The handle is differentially connected with the reel and the clutch or drag device is interposed between the handle and the reel in such a manner that the line may be played out while tensioned as the reel rotates independently of the handle against the friction of the clutch.

A variable adjustment device is provided on the handle for regulating the friction between the clutch element on the handle and the clutch element connected with the reel to meet varying conditions of use, and includes a cam device having "on" and "off" positions whereby the drag may be made quickly effective or ineffective without disturbing the adjustment thereof.

A more detailed description of my improved mechanism will appear hereinafter.

In the accompanying drawings I have shown a preferred form of device in which.

Figure 1:
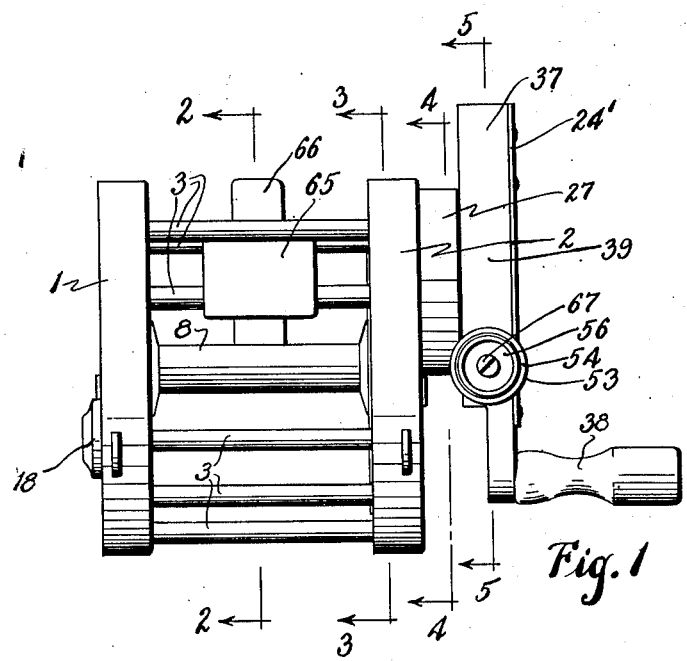
Fig. 1 is a plan view of a standard fishing reel with my improvements applied thereto.

Figs. 4 and 5 are, respectively, transverse sections of the reel on lines 4—4 and 5—5 of Fig. 1.

Fig. 6 is a longitudinal section of the reel on line 6—6 of Fig. 5.

Fig. 7 is a transverse section of the same on line 7—7 of Fig. 6.

Figs. 8 and 9 are, respectively, a plan and an elevation of an adjusting cam associated with the clutch for regulating the tension on the reel.

The reel proper is of standard form, and includes circular hollow end members 1 and 2 longitudinally spaced apart by means of a plurality of concentrically arranged spacing rods 3, 3 etc., which are attached to the end members 1 and 2 by means of screws 4, 4 etc. The members 1 and 2 are similar in form and have inwardly turned flanges 5 on their inner sides which have circular edges forming concentric openings within which flanges 6 and 7 of a reel or spool 8 are rotatably mounted. The rods 3 extend thru the outer webs and the inner flanges 5 of members 1 and 2, thus providing a rigid structure.

An end 9 of spool 8 projects into the member 1 and the outer portion thereof is journaled in a frictionless bearing 10, while the inner portion adjacent the flange 6 carries a gear or ratchet 11 fixed to the spool.

Within and pivoted at 12 to the wall of member 1 I provide a flat bar 13 which pivotally supports at 14 a click pawl 15, the inner end of which engages the teeth in the gear or ratchet 11. The free end of bar 13 has a pin 16 which extends thru an elongated slot 17 in the member 1 and has attached thereto on the outer side of said member 1 a friction disc or nut 18, by means of which the bar may be swung on its pivot 12 so as to disengage the pawl 15 from gear or ratchet 11. A spring 19 extends thru or under a portion of the pawl 15 and projects outwardly at its opposite ends over and engages pins 20, 20 which are carried on the bar 13 and serve to tension the pawl 15 so as to permit the pawl to swing as the gear 11 is rotated. This click device is a common expedient in fishing reels and is not broadly of my invention. Its use will be well understood inasmuch as it provides an alarm or signal when a strike is made.

The opposite end of spool 8 projects into the member 2 and the end portion 21 thereof is journaled in a frictionless bearing 22, while a pinion 23 is fixed to said end portion between the flange 7 and bearing 22.

A handle 24 of special design is indirectly connected with the spool 8 thru the pinion 23 and a counter-gear 25, as hereinafter described. The gear 25, for purpose of providing facility in assembling is detachably secured to a countershaft 26 by screwing the gear on an end of said shaft or otherwise.

An annular housing member 27 is suitably attached to the outer side of member 2 coaxially with the shaft 26 and supports a frictionless bearing 28 thru which the shaft 26 extends. Said member has a flange 29 and a hub 30, and a ratchet 31 is formed on or attached to said hub for engagement with a detent 33 which is pivoted at 34 to the inner side of handle 24.

A spring 35, as shown in Fig. 4, is suitably arranged within the member 27 and mounted on the handle 24 by means of a pin 36 so as to hold the detent 33 yieldably engaged with the ratchet 31 at all times.

The handle is provided with a counter-balance 37 on the opposite side of its axis from the grip 38. The central portion 39 of the handle is substantially enlarged and is bored at 40 concentric with the axis of shaft 26 to receive a drum 41 around which an external friction band 42 extends. The drum 41 may be integral with or permanently or detachably secured to the shaft 26 and is supported on a frictionless bearing 43 internally mounted in a hub 44 on the handle.

The central portion of the handle also has an outwardly projecting annular flange 45 which closely fits the bore of member 27 so as to completely house the ratchet 31 and detent 33.

As shown in Fig. 5, a recess 46 is provided adjacent the bore 40 in the handle into which an adjusting screw 47 projects. Said screw carries a pin 48 around which a portion 49 of a metal band 50 is looped. Said band 50 fits the periphery of the bore 40 and its free end 51 is hooked over the corner of the recess 46 as shown in Fig. 5.

The friction band 42 is suitably secured to the metal band 50 and overlies the drum 41. The adjusting screw 47 is loosely connected with a primary adjusting member 53 which has an annular enlargement 54 and from which an inner reduced portion 55 extends into contact with the handle 24. The outer portion of screw 47 is threaded to receive an adjusting nut 56, the inner end of which telescopes the annular portion 54 of member 53 and provides a recess within the enlarged portions of the members 53 and 56. A cam 57 is mounted within said recess and is bored at 58 to loosely fit the screw 47. Said cam is of disc-like form and is provided with a diametrical groove 58' extending entirely across the entire face of the cam.

A pair of diametrically opposite segments 59, 59 corresponding in thickness and with flat inner faces are provided on the cam, and adjacent the segments 59 other segments 60, 60 with flat faces are provided which are of less thickness than the segments 59. Intermediate the groove 58' and the segments 60 beveled segments 61 are provided which form rises between the dwells at the ends of the groove 58' and the segments 60.

A pair of screws or pins 62, 62 are diametrically mounted on the member 53 and project outwardly into the recess thereof for normal engagement with opposite portions of the groove 58'.

The cam 57 has a key 63 which engages a key-way 64 formed in the adjusting screw 47 so as to prevent the rotation of the cam on said screw. The member 53 being free to turn on the screw 47, the rotation of said member for a fraction of a revolution will cause the extended ends of the screws or pins 62 to move over the rises 61 and onto the dwells 60 of the cam. Thus when the adjusting nut 56 is set at a predetermined point the partial rotation of member 53 against cam 57 will cause the screw 47 to move outwardly thereby contracting the metal band 50 and the friction band 42 will frictionally engage the drum 41. Subsequent to such an adjustment the nut 56 may be turned in one or the other direction for further tightening or loosening the band 42 on the drum 41 without changing the position of the cam 57 in relation to member 53.

It will be understood that the ratchet 31 permits the rotation of the spool 8 and handle 24 in a given direction for winding the line on the reel, but prevents the rotation of said reel and said handle together in a reverse direction.

The connection, however, of the handle and the reel thru the instrumentality of the drum 41 and friction band 42 permits the playing out of the line and the rotation of the reel in a reverse direction while the handle is held stationarily by ratchet 31 and detent 33. When the cam is so positioned that the screws or pins 62 are seated in the groove 58' of the cam and the adjusting nut 56 is loose on its screw 47, the spool 8 will be free to rotate for playing out the line. On the other hand when the cam 57 is adjusted so that the screws 62 rest on the dwells 60 of the cam and the nut 56 is tightened on its screw 47 the reel 8 will be tensioned by the friction of band 42 on drum 41 to a predetermined extent but may yet rotate for playing out the line, depending upon the pull exerted thereon.

Figure 2:
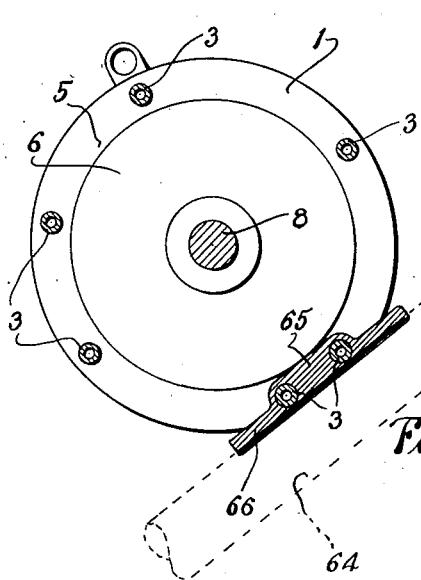
Fig. 2 is a transverse section of the same on line 2—2 of Fig. 1.
Figure 3:
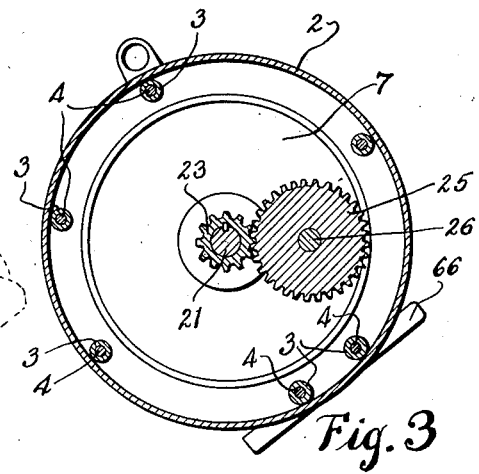
Fig. 3 is a transverse section of the same on line 3—3 of Fig. 1.

Ordinary expedients may be provided for attaching the reel to a rod, as at 64. (See Fig. 2.) For this purpose I have provided a plate 65 which is mounted on a pair of the spacers 3 and is provided with a longitudinal portion 66 which of itself or together with accompanying devices may be employed for holding the reel firmly on a rod. This feature of my improvements is not material to my invention.

By reference to Fig. 5 it will be noted that the outer extremity for adjusting screw 47 is provided with a cap nut 67 which limits the outward movement of the adjusting nut 56 on said screw.

The recesses in the handle 24 are covered by a plate 24' suitably attached to the body of the handle by screws or otherwise.

I have found that an external clutch of the character shown and described herein is eminently more adaptable to use in a fishing reel than an internal clutch. I prefer to form the band 50 of brass and the drum 41 of steel for the reason that the expansion ratio of brass is substantially three times that of steel. It will thus be apparent that when the clutch is operative, as when the line is being unreeled against the drag by the pull of a fish, the band and drum become heated and the tendency of the band in my device will be to expand away from the drum, thus preventing the locking of the band on the drum and a resultant breakage of the line. Internal clutches operate in a reverse manner, and it will be apparent that if the band 50 were internally of the drum 41 the expansion of the band would tend to lock the handle against rotation.

What I claim is:

1. A fishing reel comprising spaced end members of circular form provided with outer walls, rim portions extended inwardly therefrom and flanges inwardly turned from said rims and spaced from said walls providing circular openings concentric with the flanges, a spool rotatably held on the walls of said end members and provided with circular flanges seated in and closing said openings, and a plurality of rods extending thru apertures in the flanges of said end members and secured to the walls thereof.

2. A fishing reel comprising spaced end members of circular form provided with outer walls, rim portions extended inwardly therefrom and flanges inwardly turned from said rims and spaced from said walls providing circular openings concentric with the flanges, a spool rotatably held on the walls of said end members and provided with circular flanges seated in and closing said openings, a plurality of rods extending thru apertures in the flanges of said end members and secured to the walls thereof, and a handle rotatably mounted on one of said end members and gear connected with said spool.

3. A fishing reel comprising spaced end members of circular form provided with outer walls, rim portions extended inwardly therefrom and flanges inwardly turned from said rims and spaced from said walls providing circular openings concentric with the flanges, a spool rotatably held in the walls of said end members and provided with circular flanges seated in and closing said openings, a plurality of rods extending thru apertures in the flanges of said end members and secured to the walls thereof, a handle rotatably mounted on one of said end members and a manually operable clutch interposed between the spool and the handle and including a drum geared to the spool and a band associated with said drum and mounted on said handle, for retarding or preventing the rotation of the handle in a given direction.

4. A fishing reel comprising spaced end members of circular form provided with outer walls, rim portions extended inwardly therefrom and flanges inwardly turned from said rims and spaced from said walls providing circular openings concentric with the flanges, a spool rotatably held on the walls of said end members and provided with circular flanges seated in and closing said openings, a plurality of rods extending thru apertures in the flanges of said end members and secured to the walls thereof, a handle rotatably mounted on one of said end members and a friction clutch interposed between said spool and said handle and including a drum geared to said spool and a band associated with said drum and mounted on said handle and manually operable at will for retarding or preventing the rotation of said handle in a given direction, an adjustment device for regulating the friction of said band on said drum, and means associated therewith for rendering said clutch operative or inoperative at will without changing said adjustment.

5. A fishing reel comprising a frame, a spool, rotatable thereon, a handle rotatable on said frame, a friction clutch interposed between said spool and said handle and including a drum geared to said spool and a band associated with said drum and mounted on said handle, for retarding or preventing the rotation thereof, means for adjusting the friction of said clutch on said handle, and an auxiliary adjustment device associated with said adjustment means operable for rendering said clutch operative or inoperative at will without impairing the adjustment of said other means.

6. A fishing reel comprising a frame, a spool rotatable thereon and a handle rotatable on said frame and gear connected with said spool, a drum mounted in said handle and positively connected with said spool, an external contracting clutch band mounted in said handle around said drum, one end of said band fixed to said handle, an adjusting screw on said handle connected with the other end of said band, a collar loosely carried on said screw externally of and engaging said handle, a cam non-rotatably held on said screw adjacent said collar, an adjustment device threaded onto said screw adjacent said cam for regulating the tension of the band relative to said drum, and cooperating means on said collar and on said cam whereby a slight rotary movement of said collar in opposite directions is effective for contracting and expanding said band into operative and inoperative relation to said drum without affecting the normal adjustment of said band.

7. A fishing reel comprising a frame, a spool rotatable thereon, a handle rotatable on the frame, a clutch interposed between said spool and said handle and including a drum positively geared to said spool and a band associated with said drum and mounted on said handle, an adjusting device carried on the handle connected with said clutch, including means for adjusting the clutch relative to the drum, and a pair of associated and relatively rotatable and non-rotatable members included in said adjusting means arranged so that when said rotatable member is moved in opposite directions said clutch will be respectively operative and inoperative with respect to said drum without impairing the normal adjustment thereof.

ARTHUR KOVALOVSKY.